United States Patent
De Laet et al.

(10) Patent No.: US 12,209,632 B2
(45) Date of Patent: Jan. 28, 2025

(54) SEGMENTED VIBRATION ABSORBER

(71) Applicants: ZF Friedrichshafen AG, Friedrichshafen (DE); ZF Wind Power Antwerpen N.V., Lommel (BE); VESTAS WIND SYSTEMS A/S, Aarhus N (DK)

(72) Inventors: Wim De Laet, Antwerp (BE); Ben Marrant, Friedrichshafen (DE); Frederik Vanhollebeke, Friedrichshafen (DE)

(73) Assignees: ZF FRIEDRICHSHAFEN AG, Friedrichshafen (DE); ZF WIND POWER ANTWERPEN N.V., Lommel (BE); VESTAS WIND SYSTEMS A/S, Aarhus N (DK)

( * ) Notice: Subject to any disclaimer, the term of this patent is extended or adjusted under 35 U.S.C. 154(b) by 427 days.

(21) Appl. No.: 17/613,951

(22) PCT Filed: Mar. 5, 2020

(86) PCT No.: PCT/EP2020/055772
§ 371 (c)(1),
(2) Date: Nov. 24, 2021

(87) PCT Pub. No.: WO2020/239279
PCT Pub. Date: Dec. 3, 2020

(65) Prior Publication Data
US 2022/0228643 A1 Jul. 21, 2022

(30) Foreign Application Priority Data
May 28, 2019 (DE) .................. 10 2019 207 826.5

(51) Int. Cl.
*F16F 15/14* (2006.01)

(52) U.S. Cl.
CPC .. *F16F 15/1435* (2013.01); *F16F 2230/0029* (2013.01); *F16F 2230/32* (2013.01); *F16F 2238/02* (2013.01)

(58) Field of Classification Search
CPC .......... F16F 15/1435; F16F 2230/0029; F16F 2230/32; F16F 2238/02; F16F 15/1442; Y02E 10/72
See application file for complete search history.

(56) References Cited

U.S. PATENT DOCUMENTS

| | | | | | |
|---|---|---|---|---|---|
| 4,050,665 | A | * | 9/1977 | Matthews | F16F 7/108 248/638 |
| 4,196,786 | A | * | 4/1980 | Hornig | C07J 53/007 180/337 |

(Continued)

FOREIGN PATENT DOCUMENTS

| | | |
|---|---|---|
| DE | 2610212 A1 | 9/1977 |
| DE | 19527614 A1 | 1/1997 |

(Continued)

*Primary Examiner* — Bradley T King
*Assistant Examiner* — James K Hsiao
(74) *Attorney, Agent, or Firm* — LEYDIG, VOIT & MAYER, LTD.

(57) ABSTRACT

A vibration absorber for securely fixing to the housing of a gearbox includes an absorber mass having a first group of segments that are rotationally symmetrical to one another with respect to a rotational axis and/or central axis of the gearbox. The segments can be rigidly connected to one another. The vibration absorber can further include connectors that are rigidly connected to two segments each.

15 Claims, 3 Drawing Sheets

(56) References Cited

U.S. PATENT DOCUMENTS

| | | | | |
|---|---|---|---|---|
| 4,318,309 | A * | 3/1982 | Bremer, Jr. | F16F 15/1435 74/574.4 |
| 4,353,586 | A * | 10/1982 | Raquet | B60B 17/0017 238/382 |
| 4,560,150 | A * | 12/1985 | Shtarkman | F16F 13/20 267/152 |
| 5,445,574 | A * | 8/1995 | Sekiguchi | F16F 15/1442 475/346 |
| 5,562,544 | A * | 10/1996 | Ochs | F16F 15/1442 474/166 |
| 5,641,153 | A * | 6/1997 | Gwinn | B62D 33/0604 267/141.1 |
| 5,884,902 | A * | 3/1999 | Hamada | F16F 7/108 267/141 |
| 6,202,961 | B1 * | 3/2001 | Wilke | B64G 1/641 244/173.2 |
| 6,280,330 | B1 * | 8/2001 | Eckel | F16F 15/1435 464/3 |
| 6,308,810 | B1 * | 10/2001 | Kuwayama | F16F 15/1435 188/379 |
| 6,585,091 | B2 * | 7/2003 | Reinhart | F16F 15/1213 464/59 |
| 6,609,681 | B2 * | 8/2003 | Buder | F16F 15/08 267/141.1 |
| 7,222,823 | B2 * | 5/2007 | Thomas | B64G 1/6425 248/346.02 |
| 7,249,756 | B1 * | 7/2007 | Wilke | F16F 3/08 267/152 |
| 8,038,540 | B2 * | 10/2011 | Hoeks | F16F 15/1442 403/1 |
| 8,732,927 | B2 * | 5/2014 | Graham | F16F 7/1034 29/401.1 |
| 8,739,523 | B2 * | 6/2014 | Huegel | F16H 45/02 74/574.2 |
| 9,032,838 | B2 * | 5/2015 | Nachtmann | F16D 13/71 74/574.2 |
| 9,280,037 | B2 * | 3/2016 | Leblanc | F21V 33/0052 |
| 9,506,525 | B2 * | 11/2016 | Verhoog | F16F 15/145 |
| 9,513,452 | B2 * | 12/2016 | Vogler | G02B 7/02 |
| 9,683,626 | B2 * | 6/2017 | Verhoog | F16H 45/02 |
| 9,689,452 | B2 * | 6/2017 | Ray | F16F 7/10 |
| 9,822,840 | B2 * | 11/2017 | Fender-Oberle | F16F 15/145 |
| 10,309,485 | B2 * | 6/2019 | Hertel | F16H 45/02 |
| 10,487,910 | B2 * | 11/2019 | Siemens | F16F 15/145 |
| 10,648,533 | B2 * | 5/2020 | Tomiyama | F16F 15/1407 |
| 10,711,859 | B2 | 7/2020 | Mitsch | |
| 10,760,644 | B2 * | 9/2020 | Kawahara | F16D 3/12 |
| 11,933,269 | B2 * | 3/2024 | Caers | F16F 15/1435 |
| 2007/0279768 | A1 * | 12/2007 | Shibazaki | G02B 7/023 359/811 |
| 2009/0139811 | A1 * | 6/2009 | Mochihara | F16F 15/1435 188/268 |
| 2011/0179782 | A1 | 7/2011 | Huegel et al. | |
| 2012/0138401 | A1 * | 6/2012 | Vogler | G03F 7/70825 188/378 |
| 2013/0328337 | A1 * | 12/2013 | Melcher | B60R 1/076 248/560 |
| 2014/0216191 | A1 * | 8/2014 | Marsaudon | F16H 55/14 156/60 |
| 2015/0090102 | A1 * | 4/2015 | Faccioni | F16F 7/10 84/671 |
| 2016/0033003 | A1 * | 2/2016 | Siemens | F16F 15/145 188/379 |
| 2016/0230871 | A1 * | 8/2016 | Hirano | F16F 15/1435 |
| 2019/0078644 | A1 * | 3/2019 | Tomiyama | F16H 25/125 |
| 2019/0100066 | A1 | 4/2019 | Knetsch et al. | |
| 2020/0102999 | A1 * | 4/2020 | Zhdanov | F16F 1/3605 |
| 2021/0388819 | A1 * | 12/2021 | Caers | F16F 15/1442 |

FOREIGN PATENT DOCUMENTS

| | | |
|---|---|---|
| DE | 102009021355 A1 | 12/2009 |
| DE | 102009005954 A1 | 7/2010 |
| DE | 202014004620 U1 | 7/2014 |
| DE | 102016203950 A1 | 9/2017 |
| EP | 1898121 A1 | 3/2008 |
| EP | 3341627 B1 | 9/2019 |

\* cited by examiner

SEGMENTED VIBRATION ABSORBER

CROSS-REFERENCE TO PRIOR APPLICATIONS

This application is a U.S. National Phase application under 35 U.S.C. § 371 of International Application No. PCT/EP2020/055772, filed on Mar. 5, 2020, and claims benefit to German Patent Application No. DE 10 2019 207 826.5, filed on May 28, 2019. The International Application was published in German on Dec. 3, 2020 as WO 2020/239279 under PCT Article 21(2).

FIELD

The present disclosure relates to a vibration absorber for securely fixing to the housing of a gearbox.

BACKGROUND

Vibration absorbers are used in wind turbines to reduce gearbox vibrations. Vibrations are associated with mechanical loads and can therefore lead to gearbox damage. If the frequencies of the vibrations are within the audible range, undesirable noise emissions occur.

If the problems described emerge first in operation, it is not possible to retrofit conventional vibration absorbers. Nor is it possible to subsequently adapt conventional vibration absorbers to the vibrations that occur.

SUMMARY

In an embodiment, the present disclosure provides a vibration absorber for securely fixing to the housing of a gearbox. The vibration absorber includes an absorber mass having a first group of segments that are rotationally symmetrical to one another with respect to a rotational axis and/or central axis of the gearbox. The segments can be rigidly connected to one another. The vibration absorber can further include connectors that are rigidly connected to two segments each.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
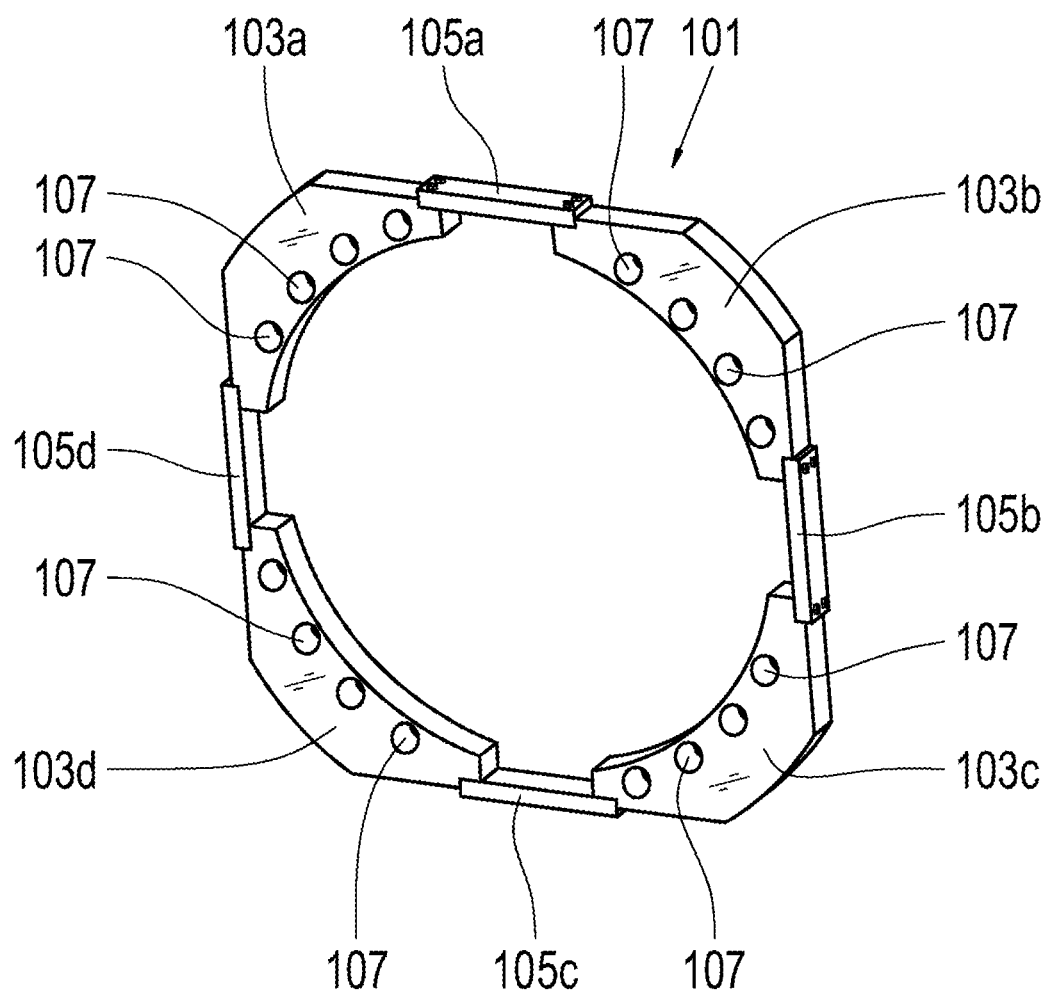
FIG. 1 shows a segmented absorber mass.

The disclosure provides a vibration absorber with improved properties in comparison to solutions known from the prior art. In particular, it should be possible to retrofit the vibration absorber and adapt it flexibly to the vibrations that occur.

The vibration absorber is designed to be fixed securely to the housing of a gearbox or to a component of the gearbox. The component is preferably a gearbox housing or a component fixed securely to the housing, i.e., a component that is rigidly fixed in the gearbox housing, i.e., without the possibility of a relative movement.

A vibration absorber is a vibration damper, the mass or absorber mass of which is elastically fixed to one or more components that are rigidly connected to one another, i.e., without the possibility of a relative movement. A vibration absorber generally has an absorber mass and one or more elastic suspensions. By means of the suspensions, the absorber mass is fixed in a component whose vibrations are to be damped.

In the present case, the absorber mass is fixed to the component of the gearbox by means of the elastic suspensions. The elastic suspensions can be elastomer bushings, for example. The bushings are each fixed in a hole in the absorber mass and screwed to the gearbox.

The absorber mass has a first group of segments. Segments denote parts of the absorber mass that are physically separated from one another. Two each of the segments are not integrally connected to one another.

The segments of the first group are rotationally symmetrical to one another with respect to a rotational axis and/or central axis of the gearbox. This means that the segments of the first group can be mapped onto one another by rotation about the rotational axis and/or central axis by at least one angle that is less than 360°.

The segments of the first group are preferably not rotationally symmetrical to the rotational axis and/or central axis. This implies that the set of angles of mappings that map the segments onto one another is discrete.

The segments can preferably be mapped onto one another by rotation exclusively by angles that are 360°/n or an integer multiple of 360°/n, wherein n denotes the number of segments. This implies that the segments or in each case two segments are identical in design.

The aforementioned rotational axis is the rotational axis of a rotatable component of the gearbox. It can be, for example, the rotational axis of a gearwheel, a shaft, or a planetary carrier.

The aforementioned central axis is a straight line on which at least two center points of a component of the gearbox, such as a ring gear, are located. The term "center point" refers to a geometric center of gravity of the component in a sectional plane that is directed orthogonally to the straight line.

The segmentation of the absorber mass makes it possible to attach the absorber mass to the gearbox at a later date. Each individual segment is also easier to handle during assembly than a conventional, unsegmented absorber mass.

In a preferred development, the segments are connected to one another rigidly, i.e., without the possibility of a relative movement. As a result of the rigid connection, the segments work together as a single absorber mass.

In a preferred development, the rigid connection between two segments each is produced by connecting means which extend between the segments and bridge a gap between the segments. This means that the connecting means are in each case rigidly connected to two segments.

In a preferred development, the segments are structurally identical. Two segments each are thus structurally identical.

In general, two components are structurally identical if they coincide in their physical parameters, in particular with regard to their material and geometry properties, within the scope of the production tolerances occurring.

In a preferred development, the absorber mass has a second group of segments. The segments of the second group have the same features as the segments of the first group. The above statements therefore apply mutatis mutandis to the segments of the second group. In particular, the segments of the second group are rotationally symmetrically, preferably rigidly, connected to one another with respect to the aforementioned rotational axis and/or central axis, wherein in each case, a connecting means preferably rigidly connects two segments of the second group to one another, and preferably structurally identically.

According to the development, the first group and the second group or the segments of the first group and the segments of the second group are arranged so as to be axially offset from one another. This means that a plane oriented orthogonally to the aforementioned rotational axis and/or central axis runs between the segments of the first group and the segments of the second group.

The development makes it possible to modify the size of the absorber mass. In particular, the size of the absorber mass can be adapted to the vibrations occurring during operation.

In a preferred development, a segment of the first group and a segment of the second group are in each case rigidly connected to one another. As a result, the segments of the first group and of the second group form a single absorber mass.

In a further preferred development, a segment of the first group and a segment of the second group are in each case structurally identical. The absorber mass thus consists of structurally identical segments. The structurally identical segments reduce variant-related costs.

The vibration absorber is preferably part of a gearbox that additionally has a ring gear. The ring gear can, for example, be part of a planetary stage, which also has one or more planetary gears, a planetary carrier, and a sun gear. The planetary gears are rotatably mounted in the planetary carrier and mesh with the ring gear and/or the sun gear. At least two of the three components sun gear, planetary carrier, and ring gear are rotatably mounted about a common rotational axis. The third component is preferably fixed securely to the housing. The rotational axis about which the at least two components are rotatably mounted is preferably the rotational axis mentioned at the outset.

According to the development, the vibration absorber is fixed to the ring gear. As described above, this fixing is elastic and is preferably implemented by means of elastomer bushings.

In a preferred development, the ring gear is screwed or joined to a housing of the gearbox by means of one or more screws or dowel pins. According to a development, the screws or dowel pins also serve to fix the vibration absorber. The vibration absorber is thus screwed or joined to the ring gear with the same screws or dowel pins with which the ring gear is screwed or joined to the housing.

This development makes it possible to also retrofit a vibration absorber to gearboxes that are structurally not intended to accommodate a vibration absorber. In addition, the use of existing screws is cost-effective.

Preferred exemplary embodiments are shown in the figures. Here, matching reference numbers indicate identical or functionally identical features.

The absorber mass 101 shown in FIG. 1 has four identical segments 103a, 103b, 103c, 103d. The segments 103a, 103b, 103c, 103d are arranged rotationally symmetrically. They can be mapped onto one another by rotating them by an angle of 90°.

Arranged between two segments 103a, 103b, 103c, 103d each is a connecting plate 105a, 105b, 105c, 105d, which rigidly connects the segments 103a, 103b, 103c, 103d to one another. The connecting plate 105a connects the segments 103a, 103b to one another, the connecting plate 105b connects the segments 103b, 103c, the connecting plate 105c connects the segments 103c, 103d, and the connecting plate 105d connects the segments 103d, 103a. The connecting plates 105a, 105b, 105c, 105d are screwed to the respective segments 103a, 103b, 103c, 103d.

For fixing in a gearbox, the segments 103a, 103b, 103c, 103d have holes 107. In the exemplary embodiments shown in the figures, there are four holes 107 per segment 103a, 103b, 103c, 103d. The fixing in the gearbox is illustrated in FIG. 2 in detail.

Figure 2:
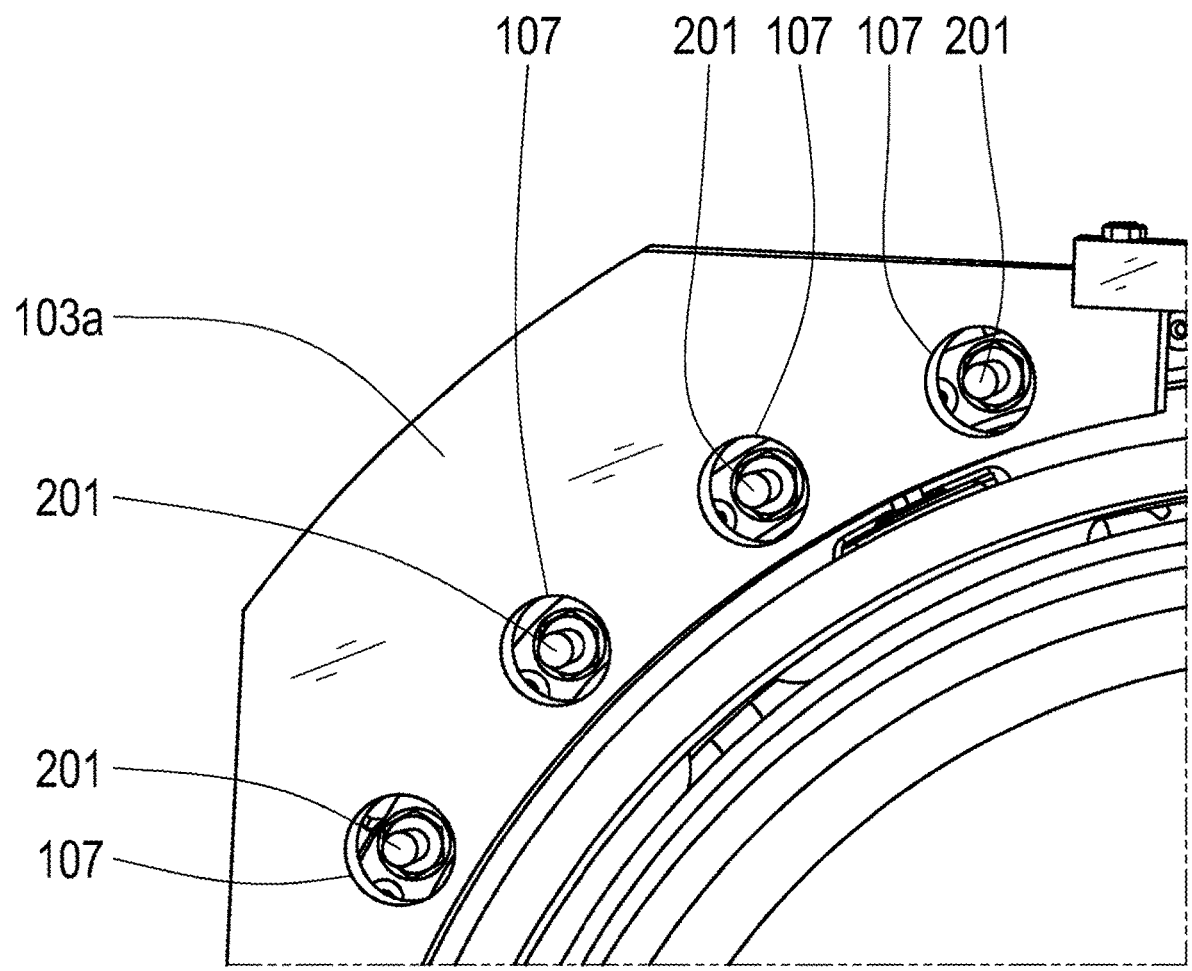
FIG. 2 shows the fixing of a segment.

FIG. 2 shows a segment 103a with its holes 107. The holes are arranged in a circle around the same axis to which the segments 103a, 103b, 103c, 103d are rotationally symmetrical. Screws 201 project into the holes 107. These are the screws by which a ring gear is screwed to a gearbox housing.

Elastomer bushings are fixed in the holes 107. They are not omitted in FIG. 2 for the sake of better illustration. The elastomer bushings in turn are screwed with the screws 201. In this way, an elastic connection is established between the ring gear and the segment 103a.

The remaining segments 103b, 103c, 103d are fixed in the ring gear in the same way.

Figure 3:
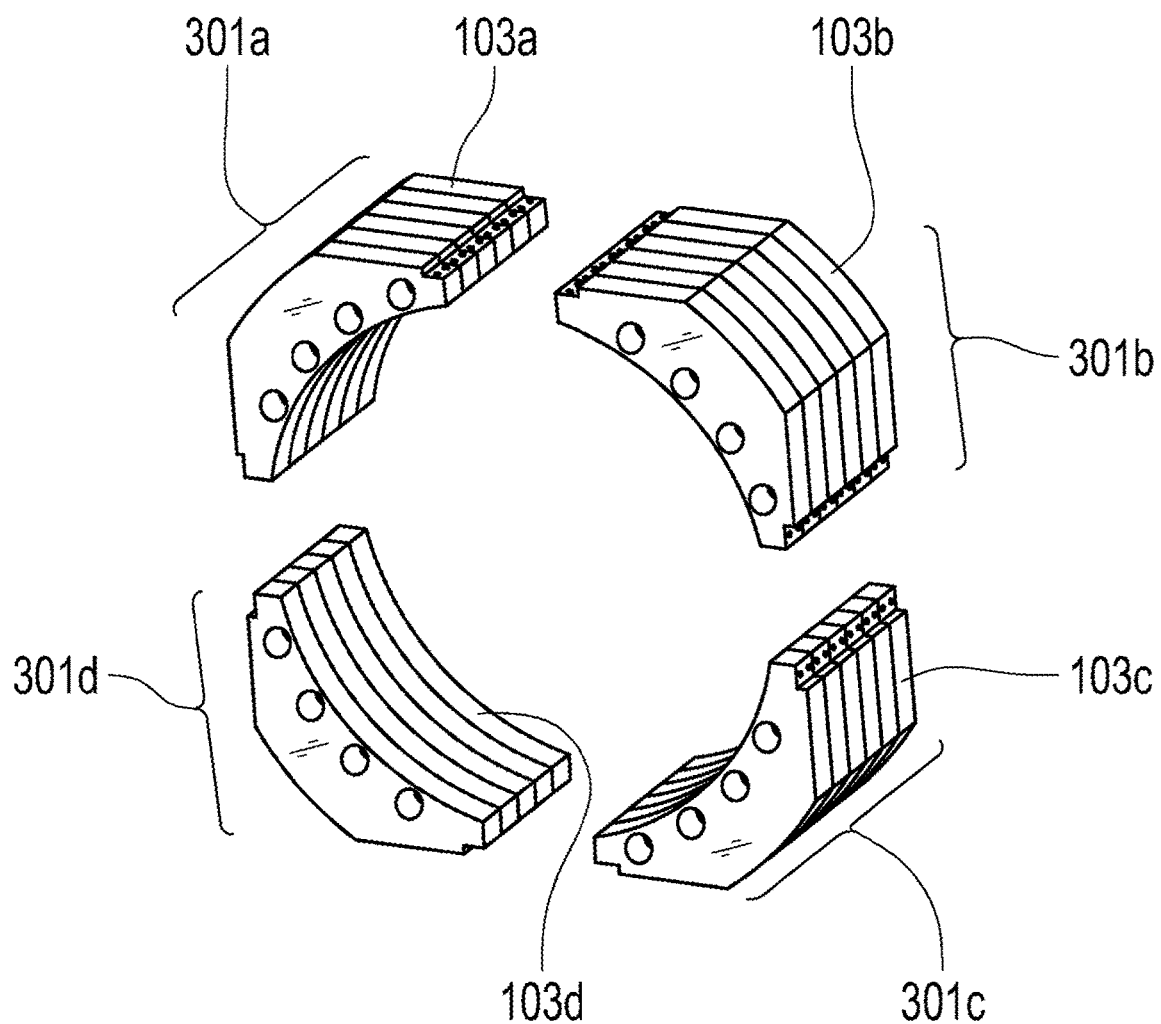
FIG. 3 shows an absorber mass with axially offset segments.

As shown in FIG. 3, each segment 103a, 103b, 103c, 103d forms a segment package 301a, 301b, 301c, 301d with further segments. The segments of each segment package 301a, 301b, 301c, 301d are arranged so as to be axially offset from one another. As a result, the respective holes 107 of the segments 103a, 103b, 103c, 103d are aligned.

The holes aligned with one another accommodate one elastomer bushing each. In the present case, each segment package 301a, 301b, 301c, 301d is thus fixed in the ring gear by four bushings. Two segments each of adjacent segment packages 301a, 301b, 301c, 301d are fixed in one another by means of connecting plates (not shown in FIG. 3).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 Absorber mass
103a Segment
103b Segment
103c Segment
103d Segment
105a Connecting plate
105b Connecting plate
105c Connecting plate
105d Connecting plate
107 Hole
201 Screw
301a Segment package
301b Segment package
301c Segment package
301d Segment package

The invention claimed is:

1. A vibration absorber for securely fixing to the housing of a gearbox; comprising:
an absorber mass having a first and second group of segments, the segments of each group being rotationally symmetrical to one another with respect to a rotational axis and/or central axis of the gearbox;
wherein the segments of the first group are rigidly connected to one another and the segments of the second group are rigidly connected to one another,
wherein the segments of the first group are configured to be stacked with segments of the second group in an axial direction, and
wherein the segments of the first group are coplanar with one another in a first plane orthogonal to the axial direction such that the segments of the first group map onto one another within the first plane by rotation about the rotational and/or central axis.

2. The vibration absorber according to claim 1, further comprising connectors that are rigidly connected to two segments each.

3. The vibration absorber according to claim 1, wherein the segments are structurally identical.

4. The vibration absorber according to claim 1, wherein one segment of the first group and one segment of the second group are in each case rigidly connected to one another.

5. The vibration absorber according to claim 1, wherein one segment of the first group and one segment of the second group are in each case structurally identical.

6. A gearbox, comprising:
at least one ring gear; and
at least one vibration absorber for securely fixing to a housing of the gearbox, including:
an absorber mass having a first and second group of segments, the segments of each group being rotationally symmetrical to one another with respect to a rotational axis and/or central axis of the gearbox,
wherein the segments of the first group are rigidly connected to one another and the segments of the second group are rigidly connected to one another,
wherein the segments of the first group are configured to be stacked with segments of the second group in an axial direction,
wherein the vibration absorber is fixed to the ring gear.

7. The gearbox according to claim 6; wherein the ring gear is screwed or joined to a housing of the gearbox by one or more screws or dowel pins, and
wherein the screws or dowel pins serve to fix the vibration absorber.

8. The vibration absorber according to claim 1, further comprising elastomer bushings configured to establish an elastic connection between the absorber mass and the housing of the gearbox or a component fixed to the housing,
wherein each of the stacks of the segments include at least one bore, and
wherein one of the elastomer bushings is fixed in the at least one bore of each of the stacks.

9. The vibration absorber according to claim 1, wherein the first group or a combination of the first and second groups forms an optimal absorber mass, and wherein a number of segments in the vibration absorber is adapted based on vibrations to be absorbed by the vibration absorber.

10. The vibration absorber according to claim 9, wherein the optimal absorber mass is formed by a combination of the first and second groups, and wherein the segments of the first and second groups that are stacked in the axial direction are rigidly connected to one another.

11. The vibration absorber according to claim 2, wherein the segments of the first group are arranged equidistant to one another and such that a gap is formed between any two segments in a circumferential direction relative to the axis of rotation and/or the central axis of the gearbox.

12. The vibration absorber according to claim 11, wherein the connectors are each arranged in one of the gaps formed between any two segments and wherein each of the connectors extend from one segment to an adjacent segment across the entirety of the respective gap in which the connector is arranged.

13. A vibration absorber frame for securely fixing to the housing of a gearbox, comprising:
a first group of frame segments, each of the frame segments having a smooth circular inner radius about a rotational axis for enclosing a shaft and flat polygonal outer surfaces,
wherein the frame segments are rotationally symmetrical to one another with respect to the rotational axis and/or a central axis of the gearbox, and
wherein the frame segments are coplanar with one another in a plane orthogonal to the rotational and/or central axis such that the frame segments map onto one another within the plane by rotation about the rotational and/or central axis.

14. The vibration absorber frame of claim 13, wherein each of the frame segments have at least one bore.

15. The vibration absorber frame of claim 14, further comprising elastomer bushings, and wherein one of the elastomer bushings is fixed in each of the at least one bores of the frame segments.

* * * * *